United States Patent
Noiret

(10) Patent No.: US 7,694,761 B2
(45) Date of Patent: Apr. 13, 2010

(54) HYBRID DRIVE CHAIN AND HYBRID VEHICLE EQUIPPED WITH SAME

(75) Inventor: Christian Noiret, Le Pecq (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 162 days.

(21) Appl. No.: 11/911,634

(22) PCT Filed: Mar. 27, 2006

(86) PCT No.: PCT/FR2006/050261

§ 371 (c)(1), (2), (4) Date: Oct. 15, 2007

(87) PCT Pub. No.: WO2006/108977

PCT Pub. Date: Oct. 19, 2006

(65) Prior Publication Data

US 2008/0185195 A1    Aug. 7, 2008

(30) Foreign Application Priority Data

Apr. 14, 2005  (FR) ................................. 05 03717

(51) Int. Cl.
B60K 6/20  (2007.10)
(52) U.S. Cl. ............... 180/65.21; 180/65.235; 180/65.6
(58) Field of Classification Search .................. 180/6.2, 180/338, 65.28, 65.23, 65.24, 65.27, 65.285, 180/65.21, 65.6, 65.235; 475/231, 223, 5; 903/903, 906, 913, 919
See application file for complete search history.

(56) References Cited

U.S. PATENT DOCUMENTS

| | | | | | |
|---|---|---|---|---|---|
| 5,960,897 | A | * | 10/1999 | Furuya et al. | 180/65.28 |
| 6,018,694 | A | * | 1/2000 | Egami et al. | 180/65.285 |
| 6,019,698 | A | * | 2/2000 | Lawrie et al. | 477/5 |
| 6,048,288 | A | * | 4/2000 | Tsujii et al. | 477/5 |
| 6,059,067 | A | * | 5/2000 | Shibahata et al. | 180/338 |
| 6,159,127 | A | * | 12/2000 | Loeffler et al. | 477/5 |
| 6,241,037 | B1 | * | 6/2001 | Karlsson | 180/6.2 |

(Continued)

FOREIGN PATENT DOCUMENTS

EP      0528412 A    2/1993

(Continued)

OTHER PUBLICATIONS

International Search Report mailed Sep. 25, 2006 in PCT/FR2006/050261.

*Primary Examiner*—Hau V Phan
(74) *Attorney, Agent, or Firm*—Nicolas E. Seckel

(57) ABSTRACT

The invention concerns a hybrid drive chain of a vehicle (1) comprising a heat engine (2) connected to a mechanical assembly (4) including a gearbox (5) coupled with a differential (6) itself coupled with the driven wheels (7G, 7D) of the vehicle (1) by their respective axle shafts (8G, 8D), and at least one electrical machine (3) including a stator (10) and a rotor (11), cooperating with the heat engine (2) via the mechanical assembly to provide heat and/or hybrid traction to the driven wheels (7G, 7D). The invention is characterized in that the electrical machine (3) is arranged between the differential (6) and one of the driven wheels (7D), by surrounding the axle shaft (8D) connecting the driven wheel (7D) to the differential (6).

20 Claims, 3 Drawing Sheets

U.S. PATENT DOCUMENTS

| | | | |
|---|---|---|---|
| 6,382,899 B1 * | 5/2002 | Cook | 180/374 |
| 6,436,002 B1 * | 8/2002 | Ishikawa et al. | 475/231 |
| 6,740,002 B1 * | 5/2004 | Stridsberg | 477/14 |
| 6,770,005 B2 * | 8/2004 | Aikawa et al. | 475/5 |
| 6,832,972 B2 * | 12/2004 | Ishikawa | 475/223 |
| 6,881,165 B2 * | 4/2005 | Endo et al. | 474/28 |
| 6,902,018 B2 * | 6/2005 | Hisada et al. | 180/65.1 |
| 7,086,978 B2 * | 8/2006 | Aikawa et al. | 475/5 |
| 7,094,172 B2 * | 8/2006 | Ishikawa | 475/231 |
| 7,276,008 B2 * | 10/2007 | Yasui et al. | 475/5 |
| 7,367,416 B2 * | 5/2008 | Seufert et al. | 180/65.31 |
| 2003/0196842 A1 | 10/2003 | Hashimoto | |

FOREIGN PATENT DOCUMENTS

| | | |
|---|---|---|
| EP | 1354744 A | 10/2003 |
| JP | 05050865 A | 3/1993 |

* cited by examiner

HYBRID DRIVE CHAIN AND HYBRID VEHICLE EQUIPPED WITH SAME

The invention relates to the field of vehicles, in particular a hybrid transmission system for use in motor vehicles.

The invention also concerns a hybrid vehicle equipped with such a hybrid traction drive.

BACKGROUND OF THE INVENTION

The layout constraints for drive trains in vehicles are increasing due to the growing number of accessories (power steering, air conditioning, . . . ), impact standards (frontal, pedestrian, . . . ) and pollution control standards (catalytic converters, particulate filters, . . . ).

The hybrid automotive drive combining heat and electric propulsion offers real advantages in reducing fuel consumption, but also in reducing pollutant gas emissions ($CO_2$ emissions).

In designing a hybrid traction drive, in addition to the usual members associated with the heat engine, at least one dedicated electrical machine must be introduced into the engine compartment so that a pure electric drive mode can be provided.

To address this issue, some auto makers offer hybrid traction drives using transmission members to provide an infinitely variable transmission, also referred to with the Anglo-Saxon abbreviation "IVT".

These transmission members consist mainly of a planetary gear train and two electrical machines.

There are several types of hybrid traction drive architecture: a so-called "series" hybrid traction drive, a so-called "parallel" hybrid traction drive and a so-called "series/parallel" (or power splitting) traction drive.

This latter architecture employs a planetary gear train coupled to the differential, and thus to the wheels of the vehicle, by means of a reduction gear. This architecture makes it possible to have an infinitely variable transmission that needs no clutch.

This type of architecture is described in particular in document WO 2005/007440.

The disadvantage of this solution is that firstly, the output is not always optimal because of the electrical power split needed to operate it, and secondly, because this architecture requires a thorough industrial retooling.

Another solution consists in sandwiching an electrical machine between the heat engine and the gearbox, with clutch-assisted torque transition.

The disadvantage of this other solution is that firstly, it increases the length of the drive train, and secondly, having the electrical machine positioned at the gearbox input reduces the hybrid operating potential.

OBJECT OF THE INVENTION

An object of the invention is a hybrid traction drive that makes it possible to remedy the disadvantages previously cited. Another object of the invention is a vehicle equipped with such a hybrid traction drive.

A particular advantage of the invention is to introduce a compact architecture in which the arrangement of the various members is optimized so as to occupy a space equivalent to that of a standard traction drive, which also optimizes the space available under the hood of the vehicle.

Another advantage of such an architecture is that it does not require any specific industrial development.

Other advantages derived directly from the architecture of a hybrid traction drive according to the invention are listed as follows:

The electrical machine can be used to recover energy during breaking phases.

The electrical machine can also be used to reduce torque discontinuity during gear ratio shift phases.

The electrical machine can be engaged to the bridge directly or via a reduction gear that makes it possible to fine-tune its electrical characteristics.

Lastly, the electrical machine can be used to accurately gauge the speed of the vehicle wheels and provide a replacement for ABS speed sensing.

BRIEF SUMMARY OF THE INVENTION

The invention concerns a hybrid traction drive for a vehicle with a heat engine coupled to a mechanical assembly having a gearbox coupled to a differential, which is in turn coupled to the driven wheels of the vehicle by their respective transmission shafts, and at least one electrical machine having a stator and a rotor, cooperating with the heat engine via the mechanical assembly in order to provide combustion drive and/or electrical drive to the driven wheels.

Said hybrid traction drive is characterized in that the electrical machine is positioned between the differential and one of the driven wheels, surrounding the transmission shaft connecting the driven wheel to the differential.

In this way, advantageously, the electrical machine is placed in a location that is usually empty, and its introduction requires only slight modifications to the engine and the mechanical assembly.

According to another characteristic, the rotor of the electrical machine is integrally mounted on a hollow shaft surrounding the transmission shaft and whose end facing the differential is arranged to be mechanically coupled to the differential.

According to a first mode of embodiment of the invention defined above, the rotor is mechanically coupled directly to the differential.

According to this first mode of embodiment, the differential has a section of hollow shaft provided with splines that mesh with the end of the hollow shaft of the electrical machine, the hollow shaft having splines that fit together with those on the section of hollow shaft.

According to a second mode of embodiment, the rotor of the electrical machine is mechanically coupled to the differential via a speed reduction means located between the electrical machine and the differential.

According to a first variant, the speed reduction means has a planetary gear train installed between the rotor of the electrical machine and the ring gear of the differential; the end of the rotor forms the sun gear of the planetary gear train and the ring gear of the differential forms the ring gear of the planetary gear train.

According to the invention as defined above, the output of the differential, which rotatably receives and supports a first end of the transmission shaft, is rotatably supported inside the rotor.

According to a second variant, the speed reduction means is a pinion reducer.

According to this variant, the pinion reducer has first and second pinions of different diameters; the first and second pinions are rotatably connected to and mesh with the ring gear of the differential and a gear wheel attached to the rotor, respectively.

In accordance with an advantageous feature, the first pinion is located in a housing attached onto the mechanical assembly containing the differential, and the second pinion is located in the body that encloses the electrical machine, with both pinions being rotatably coupled to a drive shaft.

According to another variant, the electrical machine is hollow, and is sealed by arranging an internal partition encapsulating the rotor.

According to the invention as defined above, the electrical machine is enclosed in a body whose end opposite the differential has bearing forming means for the second end of the transmission shaft.

These bearing forming means support the heat engine torque rod.

Another object of the invention is a hybrid vehicle equipped with a hybrid traction drive as previously defined.

BRIEF DESCRIPTION OF DRAWINGS

Other characteristics and advantages of the present invention will become clearer in the following description of non-limiting modes of embodiment of the invention, referring to the attached drawings, in which.

Elements appearing in more than one figure are labeled with the same reference numbers.

DETAILED DESCRIPTION OF THE INVENTION

Figure 1:
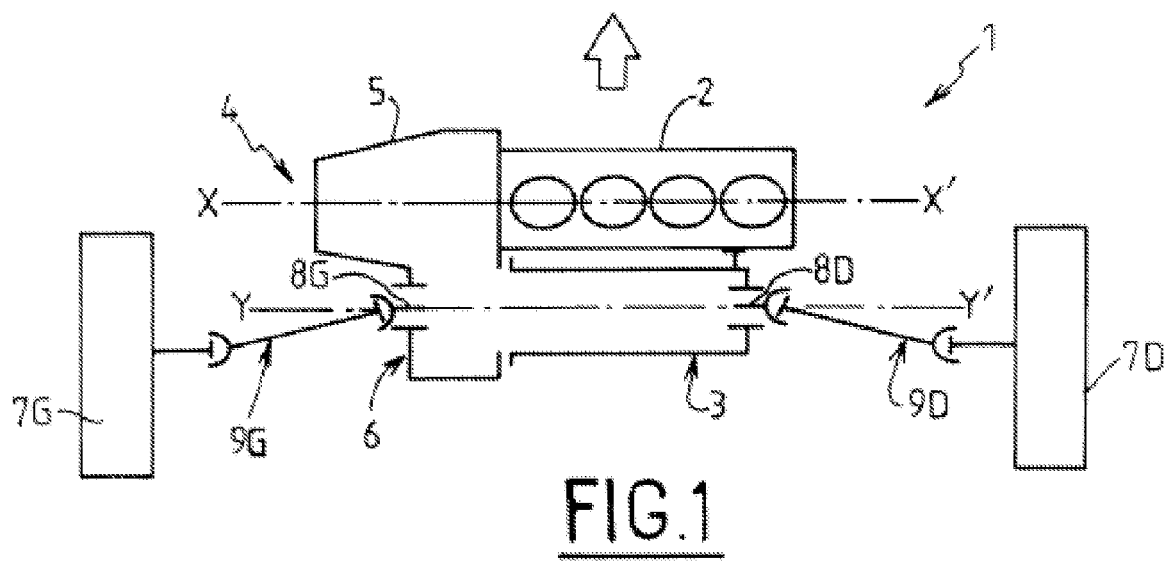
FIG. 1 illustrates a top view of a layout of a hybrid traction drive according to the invention in a motor vehicle.

FIGS. 1 to 4 all show a top view of the front of a motor vehicle 1, if it is a front wheel drive vehicle, or of the rear of the vehicle, if it is a rear-wheel-drive vehicle.

In the present description, the various figures will be considered as representing the front of the vehicle.

This overview schematically illustrates a layout of the main members of a motor vehicle hybrid traction drive, namely, a heat engine 2, an electrical machine 3, a mechanical assembly 4 having a gearbox 5 and a differential 6 having first and second outputs 6G and 6D coupled respectively to the driven wheels 7G and 7D of the vehicle 1 via two transmission shafts 8G and 8D and connecting means to the ground 9G and 9D, respectively.

The gearing assembly with which a gearbox is traditionally equipped is purposely not shown so as to not clutter up the figures needlessly.

In accordance with this layout, the electrical machine 3, dedicated to the electrical propulsion of the vehicle 1, is located behind the heat engine 2 and attached to it.

The direction the vehicle 1 moves in forward drive is shown by an arrow in FIG. 1.

According to the modes of embodiment described, the rotation axis YY' of the electrical machine 3 is parallel to the longitudinal axis XX' of the heat engine 2. The axes XX' and YY' lie respectively in planes parallel to one another. They can also lie in planes that form an angle with one another.

The mechanical assembly 4 is laid out in a direction perpendicular to the two axes XX' and YY'. It is located at and attached to the end of the heat engine 2 and the electrical machine 3, with the heat engine 2 and/or the electrical machine 3 respectively coupled to the driven wheels 7G, 7D via this mechanical assembly 4.

The electrical machine 3 has a stator 10 and a rotor 11 that are concentric and hollow, both of which are housed inside a body 12 whose general shape is cylindrical. The body 12 has a central cavity 13 extending along the longitudinal axis YY' of the electrical machine. The stator 10 is attached to the body 12 and the rotor 11 is set inside the stator 10 and surrounds the cavity 13.

The rotor 11 is integral with a hollow shaft 14 whose two free ends extend beyond the stator 11 and are rotatably supported by and connected to first and second bearings 15 and 16, respectively, attached to the body 12 of the electrical machine 3. The hollow shaft 14 thus defines the cavity 13 around which the electrical machine 3 is arranged.

The transmission shaft 8D is rotationally mounted, centered inside the cavity 13, and extends out both ends of the body 12.

A first end of the transmission shaft 8D is coupled to one 7D of the driven wheels 7G and 7D via the connection to the ground plane 9D, and the second end is coupled to the first output 6D of the differential 6.

The first output 6D of the differential 6 extends inside the cavity 13, thus inside the hollow shaft 14 supporting the rotor 11.

A third bearing 17 is set in the same plane as the first bearing 15. It is supported inside the hollow shaft 14 and serves to center the first output 6D of the differential 6 with the transmission shaft 8D.

The stator 10, rotor 11, cavity 13 and wheel shaft 8D are concentric and on the same axis as the longitudinal axis YY' of the electrical machine 3.

Figure 2:
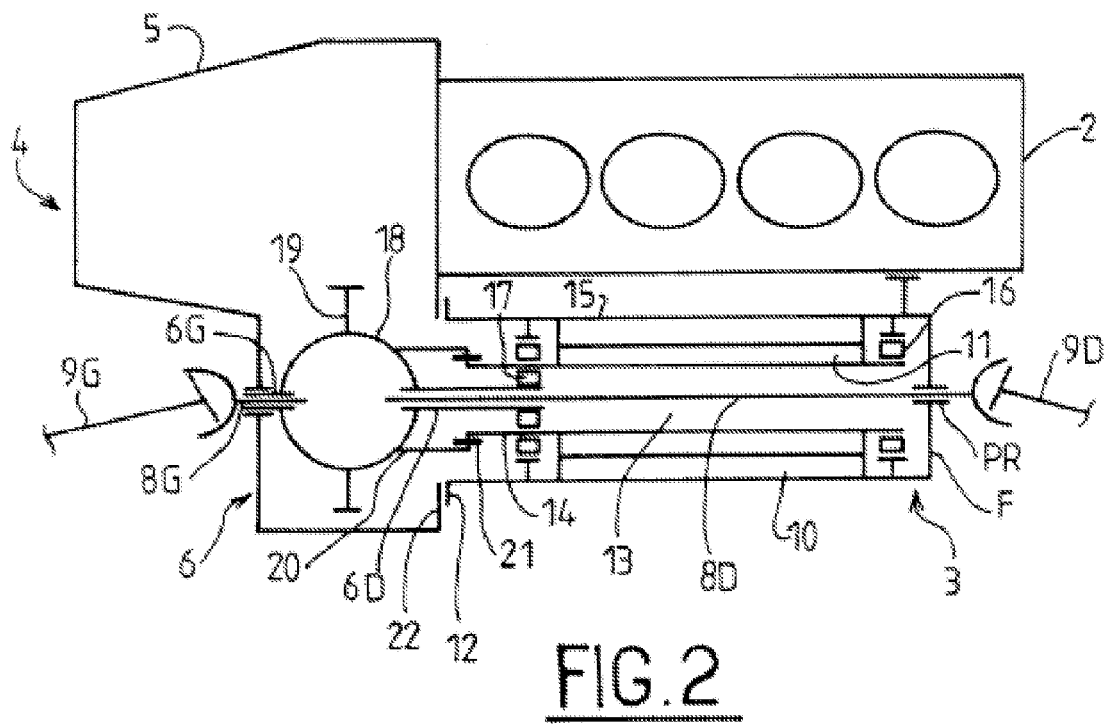
FIG. 2 schematically illustrates a first mode of embodiment of a hybrid traction drive according to the invention.

According to the mode of embodiment in FIG. 2, the electrical machine 3 is directly engaged with the differential 6.

The rotor 11 is mechanically rotatably coupled on one of its ends to the differential 6 case 18.

In a manner known per se, the differential 6 supplies a gear reduction torque to each of the driven wheels 7G, 7D of the vehicle 1 while driving them. It traditionally has a ring gear 19 that is mechanically coupled to the shaft (not shown) of the heat engine 2 via the gearbox 5, which has a series of gear assemblies that are not shown. The ring gear 19 is located at the periphery of the case 18, which is hollow and which supports and encloses planet gears (not shown) mounted so as to rotate freely around their respective planet carriers (not shown), which are supported in the case 18.

When the ring gear 19 of the differential 6 is being rotationally driven, the planet gears drive sun gears (also not shown), which are generally bevel pinions integral with and mounted on the end of each transmission shaft 8G and 8D, respectively.

The case 18 is further provided with a portion of hollow shaft 20 centered on the axis YY' and capable of engaging rotationally with the end 21 of the hollow shaft 11. There are splines designed to fit together, for example, on the hollow shafts 20 and 21, respectively. The splines can run along the inside of the hollow shaft 20 and the outside of the hollow shaft 21, or the reverse. In the first case, as illustrated in FIG. 2, the end of the hollow shaft 21 goes into and meshes inside the section of hollow shaft 20.

In the reverse case, the section of hollow shaft 20 would go into and mesh inside the end of the hollow shaft 21.

The gear assembly 20, 21 thus formed is situated roughly at the interface between the housing 22 of the mechanical assembly 4 and the body 12 of the electrical machine 3. The second end of the transmission shaft 8D is rotatably supported at the far end F of the body 12 of the electrical machine 3 by a bearing PR. With the special layout of the electrical machine 3 according to the invention, the body 12 conveniently assumes the function of an intermediate coupling, which is usually done with an insert that serves as a linkage between the transmission shaft and the torque rod (not shown) of the heat engine 2.

According to this arrangement, then, the wheels 7G and 7D are driven directly, either by the heat engine 2 or by the electrical machine 3, in an optimized space.

Figure 3:
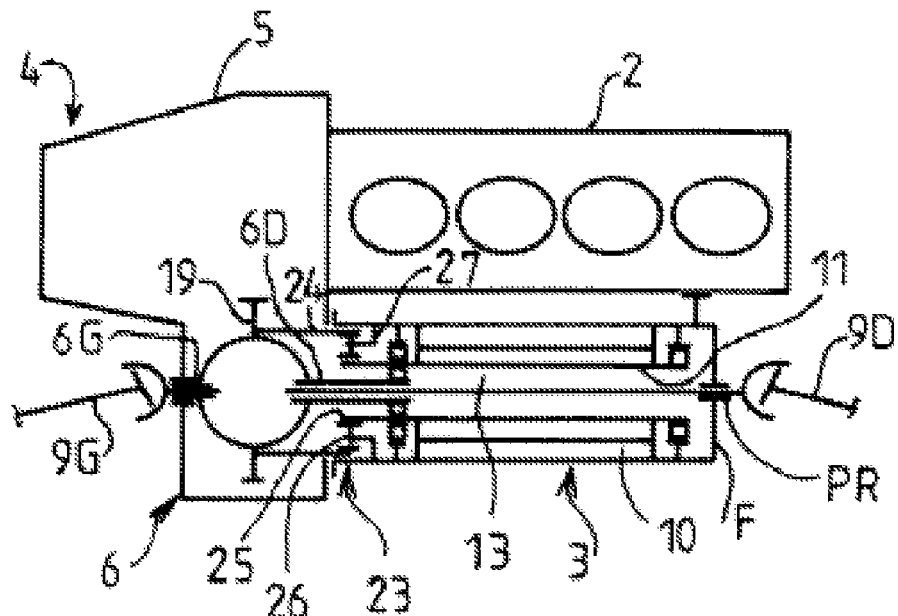
FIG. 3 schematically illustrates a second mode of embodiment of a hybrid traction drive according to the invention.

The mode of embodiment in FIG. 3 is distinguished from that in FIG. 2 in that the coupling between the electrical machine 3 and the differential 6 is achieved by means of a planetary reduction gear 23.

The reduction gear 23 consists of a planetary gear train installed between the hollow shaft 14 integral with the rotor 11 of the electrical machine 3 and the ring gear 19 of the differential 6.

The ring gear 19 supports a section of splined hollow shaft 24 forming the ring gear of the planetary gear train 23.

As in the mode of embodiment in FIG. 2, the hollow shaft 14 supporting the rotor 11 is provided with splines 25 on the side of the differential 6, which form the sun gear of the planetary gear train 23 in this mode of embodiment.

Planet gears 26 are located between the ring gear 24 and the sun gear 25 and mesh with them. They are supported by planet carriers 27, which are in turn attached to the body 12 of the electrical machine 3.

Figure 4:
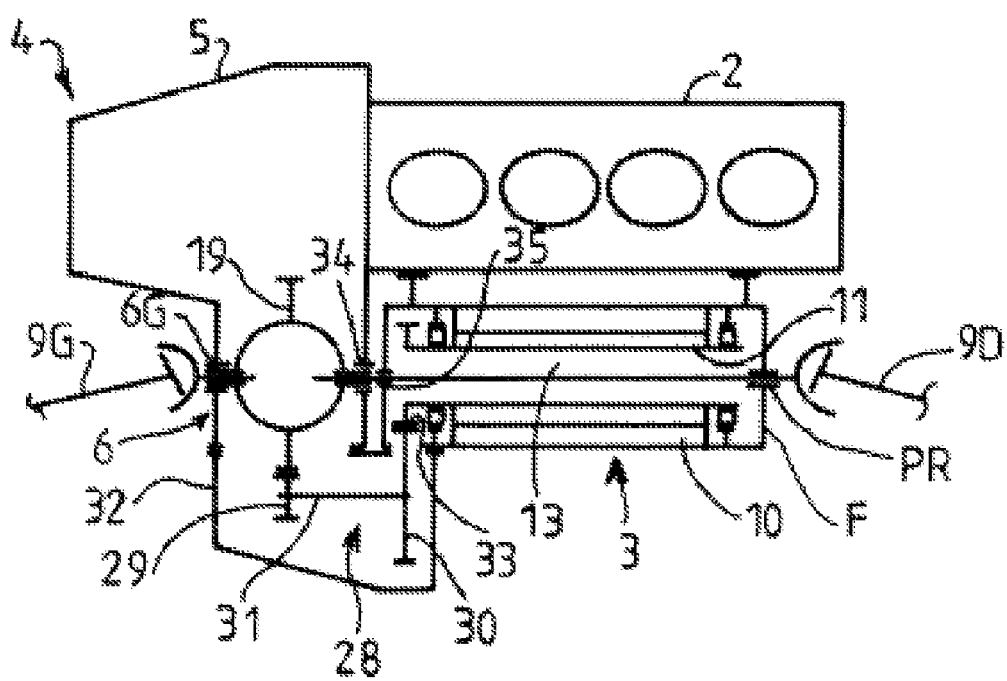
FIG. 4 schematically illustrates a third mode of embodiment of a hybrid traction drive according to the invention.

According to the mode of embodiment in FIG. 4, the coupling between the electrical machine 3 and the differential 6 is achieved by means of a pinion reducer 28.

The reducer 28 is made up of a gear train having first and second pinions 29 and 30 of different diameters, rotationally linked and respectively placed at first and second ends of a secondary shaft 31. The shaft 31 extends between the ring gear 19 of the differential 6 and a gear wheel 33 attached to the hollow shaft 14 of the rotor 11 on the end nearest the differential 6; the first and second pinions 29 and 30 mesh with the ring gear 19 of the differential 6 and the gear wheel 33, respectively.

To aid with assembly tolerance and ease of assembly, it may be advantageous to embody the secondary shaft 31 as two segments rotationally linked to one another.

The purpose of this gear train is to mechanically couple the ring gear 19 of the differential 6 to the rotor 11 of the electrical machine 3 with a gear ratio set by the ratio of the diameters and the number of teeth of the pinions 29 and 30.

In this mode of embodiment, the pinion reducer 28 is placed inside a housing 32 that is arranged and attached underneath the mechanical assembly 5 and partially under the body 12 of the electrical machine 3. The larger diameter pinion 30 extends partially out of the housing 32 in order to mesh with the gear wheel 33 of the rotor 11 inside the body 12 of the electrical machine 3. The ring gear 19 of the differential 6 extends out of the housing 22 of the mechanical assembly 5 in order to mesh with the smaller diameter pinion 29 inside the housing 32 of the reducer 28.

The output 6D of the differential 6 is rotatably supported by and connected to the housing 22 of the mechanical assembly 5 via a bearing 34 integral with the housing 22.

The transmission shaft 8D is rotatably supported by and connected to the body 12 of the electrical machine 3 via a bearing 35 integral with the body 12.

In this mode of embodiment, the output 6D of the differential 6 does not go into the electrical machine 3, as the electrical machine 3 couples with the differential 6 via the pinion reducer 28.

Figure 5:
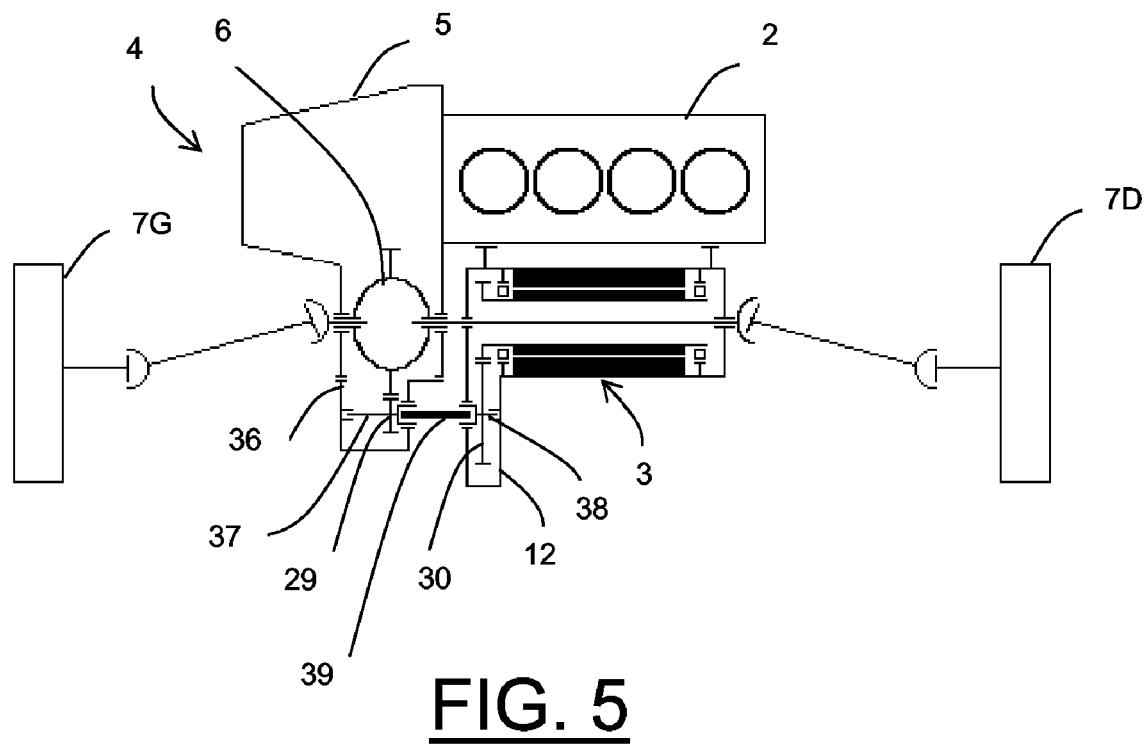
FIG. 5 schematically illustrates a first variant of the third mode of embodiment of a hybrid traction drive according to the invention.

A first variant of the third mode of embodiment shown in FIG. 4 is illustrated in FIG. 5, and likewise has a pinion reducer 28 consisting of a gear train having first and second pinions 29 and 30 of different diameters, but they are arranged differently, taking the form of two speed reduction stages, one of the two stages being located in the body 12 with the electrical machine.

In this first variant, the first pinion 29 is housed and supported by itself inside a housing 36 that is arranged and attached under the mechanical assembly 4. The pinion 29 is integral with a shaft 37 that is rotatably attached on both ends to two bearings integral with the housing 36. One of the two bearings, in particular the bearing facing the electrical machine 3, is open to provide outside access to the free end of the first shaft 37. This free end is furnished with a rotatable coupling means capable of receiving an external drive shaft. The coupling means is provided by means of a splined shaft-type connection, for example.

Also in this first variant, the pinion 30 is housed and supported by itself inside the body 12 of the electrical machine 3.

The body 12 of the electrical machine 3 has a protrusion here pointing toward the housing 36 of the pinion 29, in order to enclose the pinion 30 mounted on its shaft. In the same way as for the pinion 29, the pinion 30 is integral with a shaft 38 that is rotatably attached on both its ends to two bearings integral with the body 12 of the electrical machine 3. One of the two bearings, in particular the bearing facing the housing 36, is open to provide outside access to the free end of the shaft 38. This free end is furnished with a rotatable coupling means capable of receiving an external drive shaft. The coupling means is embodied by means of a splined shaft-type connection, for example.

Movement is transmitted from the electrical machine 3 to the differential 6 by an external drive shaft 39 that is inserted between the free ends of the shafts 37 and 38 carrying the pinions 29 and 30, respectively. The ends of the intermediate shaft 39 are shaped so as to engage with the free ends of the shafts 37 and 38, respectively, carrying the pinions 29 and 30, respectively.

Of course, all the variants relating to the embodiment of this drive shaft 39 can be considered. For example, the driveshaft can be combined with either one of the shafts 37 or 38 carrying the pinions 29 and 30.

This arrangement allows the electrical machine 3 to be made completely independent of the mechanical assembly 4 including the gearbox 5. The housing 36 and body 12 corresponding to the mechanical assembly 4 and the electrical machine 3, respectively, are sealed separately at their input/output accesses by simple gasket seals.

In addition, the arrangement thus proposed is completely modular. The electrical machine 3 can be fitted to an existing drive train with no major modification of the heat engine 2 or the mechanical assembly 4.

Figure 6:
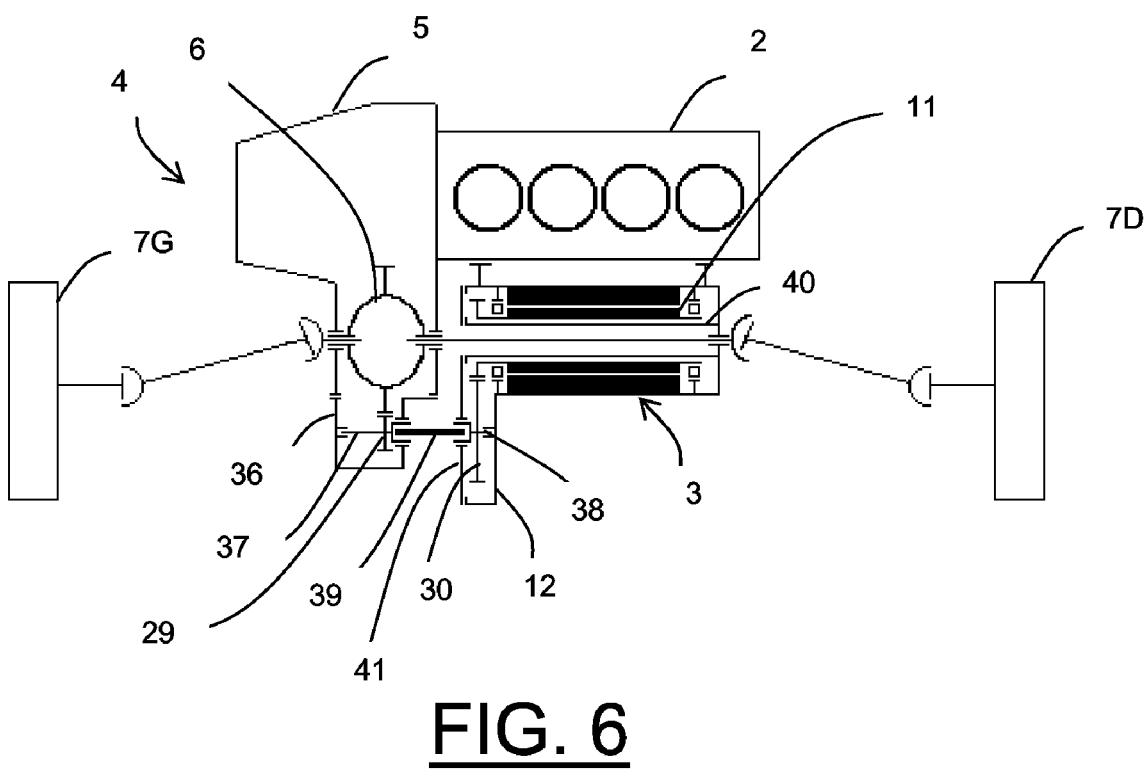
FIG. 6 schematically illustrates a second variant of the third mode of embodiment of a hybrid traction drive according to the invention.

A second variant of the third mode of embodiment is illustrated in FIG. 6, reiterating the same type of coupling as that in FIG. 5; in this variant the electrical machine 3 is hollow and is sealed by arranging an internal partition 40 encapsulating the rotor 11.

It is no longer necessary to have a seal at the bearings, and a simple cover 41 is adequate to close the body 12 of the electrical machine 3.

The present invention is not limited to the modes of embodiment described, of course, and can encompass all variants falling within the ambit of the claims.

The invention claimed is:

1. A hybrid traction drive for a vehicle comprising:
a heat engine coupled to a mechanical assembly,
wherein the mechanical assembly comprises a gearbox coupled to a differential, the differential being coupled to the driven wheels of the vehicle by their respective transmission shafts, and
at least one electrical machine having a stator and a rotor, cooperating with the heat engine via the mechanical assembly in order to provide at least one of combustion and electrical drive to the driven wheels,
wherein the electrical machine is positioned between the differential and one of the driven wheels, surrounding the transmission shaft connecting the driven wheel to the differential,
wherein a main axis of the electrical machine is coaxial with a main axis of the transmission shaft, and
wherein the electrical machine is housed inside a body distinct from the mechanical assembly.

2. The hybrid traction drive according to claim 1, wherein the rotor of the electrical machine is integrally mounted on a hollow shaft surrounding the transmission shaft whose end facing the differential is arranged to be mechanically coupled to the differential.

3. The hybrid traction drive according to claim 2, wherein the rotor is mechanically coupled directly to the differential.

4. The hybrid traction drive according to claim 3, wherein the differential has a section of hollow shaft provided with splines that mesh with the end of the hollow shaft of the electrical machine, the hollow shaft having splines that fit together with those on the section of hollow shaft.

5. The hybrid traction drive according to claim 2, wherein the rotor of the electrical machine is mechanically coupled to the differential via a speed reduction means located between the electrical machine and the differential.

6. The hybrid traction drive according to claim 5, wherein the speed reduction means has a planetary gear train installed between the rotor of the electrical machine and the ring gear of the differential, the end of the rotor forming the sun gear of the planetary gear train and the ring gear of the differential forming the ring gear of the planetary gear train.

7. The hybrid traction drive according to claim 5, wherein the speed reduction means is a pinion reducer.

8. The hybrid traction drive according to claim 7, wherein the pinion reducer has first and second pinions of different diameters, the first and second pinions being rotatably connected to and meshing with the ring gear of the differential and a gear wheel attached to the rotor, respectively.

9. The hybrid traction drive according to claim 8, wherein the first pinion is located in a housing attached onto the mechanical assembly containing the differential, and in that the second pinion is located in the body that encloses the electrical machine, with both pinions being rotatably coupled to a drive shaft.

10. The hybrid traction drive according to claim 9, wherein the electrical machine is hollow, and is sealed by arranging an internal partition encapsulating the rotor.

11. The hybrid traction drive according to claim 1, wherein the output of the differential, which rotatably receives and supports a first end of the transmission shaft, is rotatably supported inside the rotor.

12. The hybrid traction drive according to claim 1, wherein the end of the body containing the electrical machine opposite from the differential has bearing forming means for the second end of the transmission shaft.

13. The hybrid traction drive according to claim 12, wherein the bearing forming means supports the heat engine torque rod.

14. A hybrid vehicle, characterized in that the hybrid vehicle is equipped with a hybrid traction drive according to claim 1.

15. A hybrid traction drive for a vehicle comprising:
a heat engine coupled to a mechanical assembly,
wherein the mechanical assembly comprises a gearbox coupled to a differential, the differential being coupled to the driven wheels of the vehicle by their respective transmission shafts, and
at least one electrical machine having a stator and a rotor, cooperating with the heat engine via the mechanical assembly in order to provide at least one of combustion and electrical drive to the driven wheels,
wherein the electrical machine is positioned between the differential and one of the driven wheels, surrounding the transmission shaft connecting the driven wheel to the differential,
wherein the electrical machine is housed inside a body distinct from the mechanical assembly, and
wherein the rotor of the electrical machine is integrally mounted on a hollow shaft surrounding the transmission shaft whose end facing the differential is arranged to be mechanically coupled to the differential.

16. The hybrid traction drive according to claim 15, wherein the rotor is mechanically coupled directly to the differential.

17. The hybrid traction drive according to claim 16, wherein the differential has a section of hollow shaft provided with splines that mesh with the end of the hollow shaft of the electrical machine, the hollow shaft having splines that fit together with those on the section of hollow shaft.

18. The hybrid traction drive according to claim 15, wherein the rotor of the electrical machine is mechanically coupled to the differential via a speed reduction means located between the electrical machine and the differential.

19. The hybrid traction drive according to claim 15, wherein the speed reduction means has a planetary gear train installed between the rotor of the electrical machine and the ring gear of the differential, the end of the rotor forming the sun gear of the planetary gear train and the ring gear of the differential forming the ring gear of the planetary gear train.

20. A hybrid traction drive for a vehicle comprising:
a heat engine coupled to a mechanical assembly,
wherein the mechanical assembly comprises a gearbox coupled to a differential, the differential being coupled to the driven wheels of the vehicle by their respective transmission shafts, and
at least one electrical machine having a stator and a rotor, cooperating with the heat engine via the mechanical assembly in order to provide at least one of combustion and electrical drive to the driven wheels,
wherein the electrical machine is positioned between the differential and one of the driven wheels, surrounding the transmission shaft connecting the driven wheel to the differential,
wherein the electrical machine is housed inside a body distinct from the mechanical assembly, and
wherein the output of the differential, which rotatably receives and supports a first end of the transmission shaft, is rotatably supported inside the rotor.

* * * * *